Figure 2:
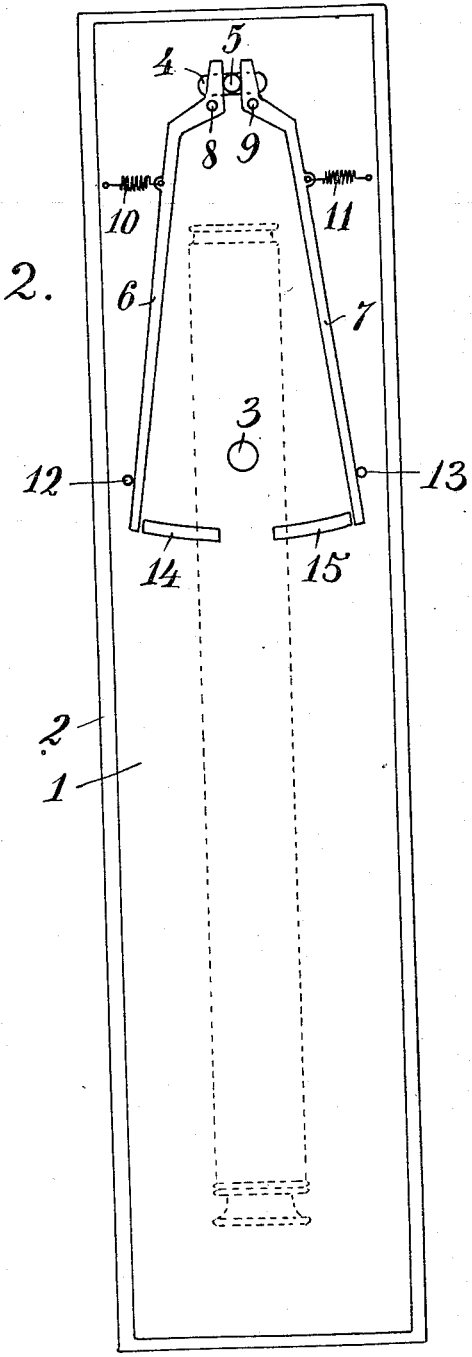

F. ANDERSEN.
SYSTEM AND APPARATUS OF AUTOMATIC ELEVATION AND LATERAL DIRECTION OF ONE OR MORE GUNS.
APPLICATION FILED APR. 29, 1912.
1,167,247.
Patented Jan. 4, 1916.
5 SHEETS—SHEET 1.
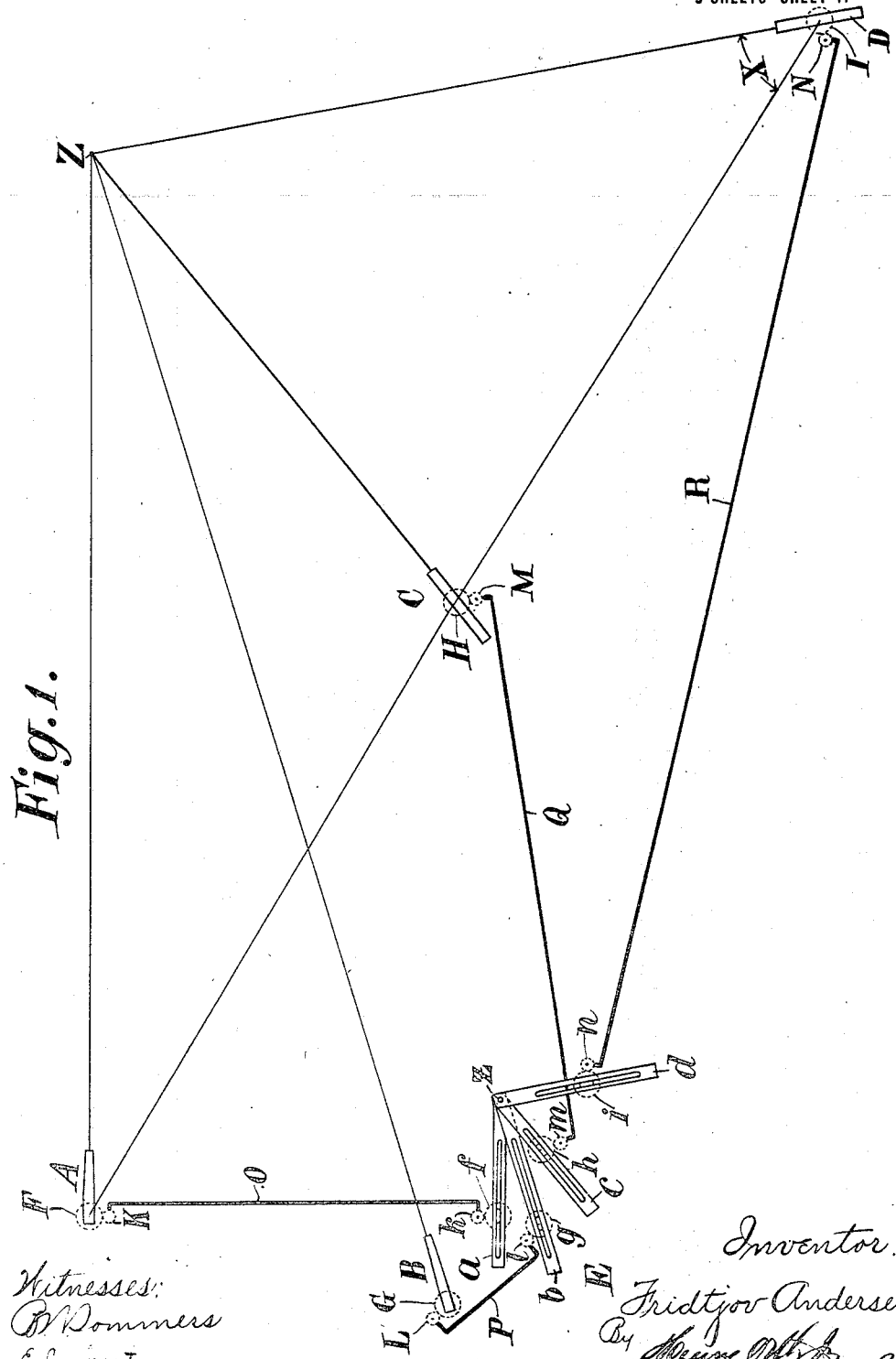
Fig. 1.
Witnesses:
B. Dommers
E. Leckert.
Inventor.
Fridtjov Andersen,
By  Atty.

F. ANDERSEN.
SYSTEM AND APPARATUS OF AUTOMATIC ELEVATION AND LATERAL DIRECTION OF ONE OR MORE GUNS.
APPLICATION FILED APR. 29, 1912.

1,167,247.
Patented Jan. 4, 1916.
5 SHEETS—SHEET 5.

UNITED STATES PATENT OFFICE.

FRIDTJOV ANDERSEN, OF HAAÖEN, NEAR TÖNSBERG, NORWAY.

SYSTEM AND APPARATUS OF AUTOMATIC ELEVATION AND LATERAL DIRECTION OF ONE OR MORE GUNS.

1,167,247.        Specification of Letters Patent.        Patented Jan. 4, 1916.

Application filed April 29, 1912. Serial No. 693,847.

*To all whom it may concern:*

Be it known that I, FRIDTJOV ANDERSEN, a subject of the King of Norway, residing at Haaöen, near Tönsberg, Norway, have invented certain new and useful Improvements in Systems and Apparatus of Automatic Elevation and Lateral Direction of One or More Guns; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to range finding and automatic sighting and gun laying systems and apparatus, and refers to arrangements in which a gun or more than one gun may be properly elevated and traversed from one point or more than one point, which points may have any positions relatively to the gun and to each other.

The improved system which comprises synchronously running motors, or synchronously moved members controlled by contact devices, the duration of contact between which contact devices is controlled by the sighting apparatus which may be situated at a point or points distant from the gun, is distinguished by the fact that angular movement of one observation bar, or the relative angular movement of two observation bars respectively, which are moved by the sighting apparatus results in angular and longitudinal movements at a central station of a bar or bars corresponding in number and disposition to the sighting apparatus and also of a bar or bars corresponding in number and disposition to the gun or guns, the bars corresponding to the guns and telescopes being pivotally connected at a point and made slidable over fixed points, the positions of which latter correspond to the geographical positions of the telescopes and guns. The synchronous motors controlled as aforesaid, cause the angular movements of the telescopes to be communicated to the corresponding bars at the central station and also the consequent angular motion of the bars corresponding to the guns, to be communicated to the guns.

In order to enable the invention to be readily understood, reference is made to the accompanying drawings, in which:—

Figure 3:
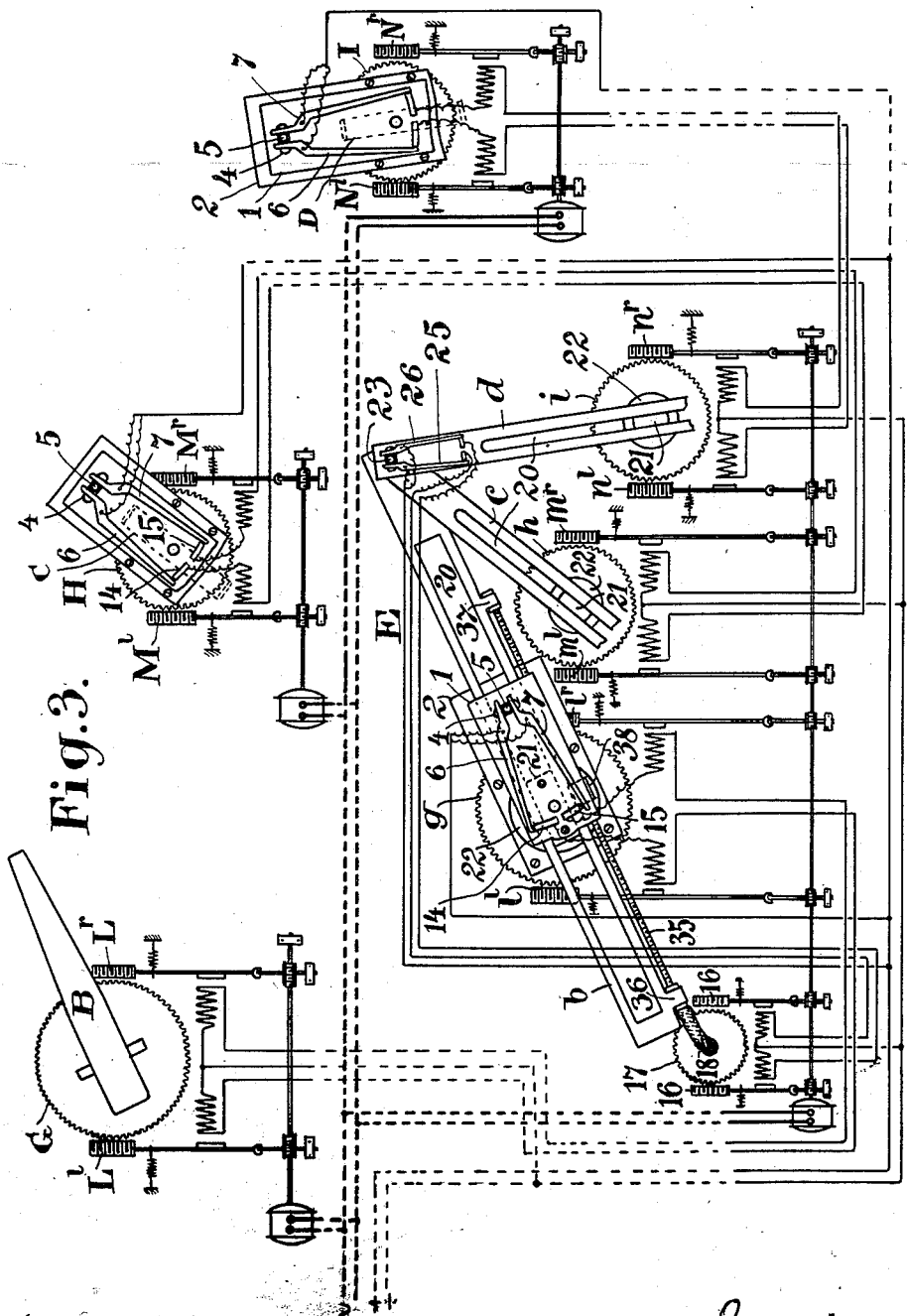
Figure 4:
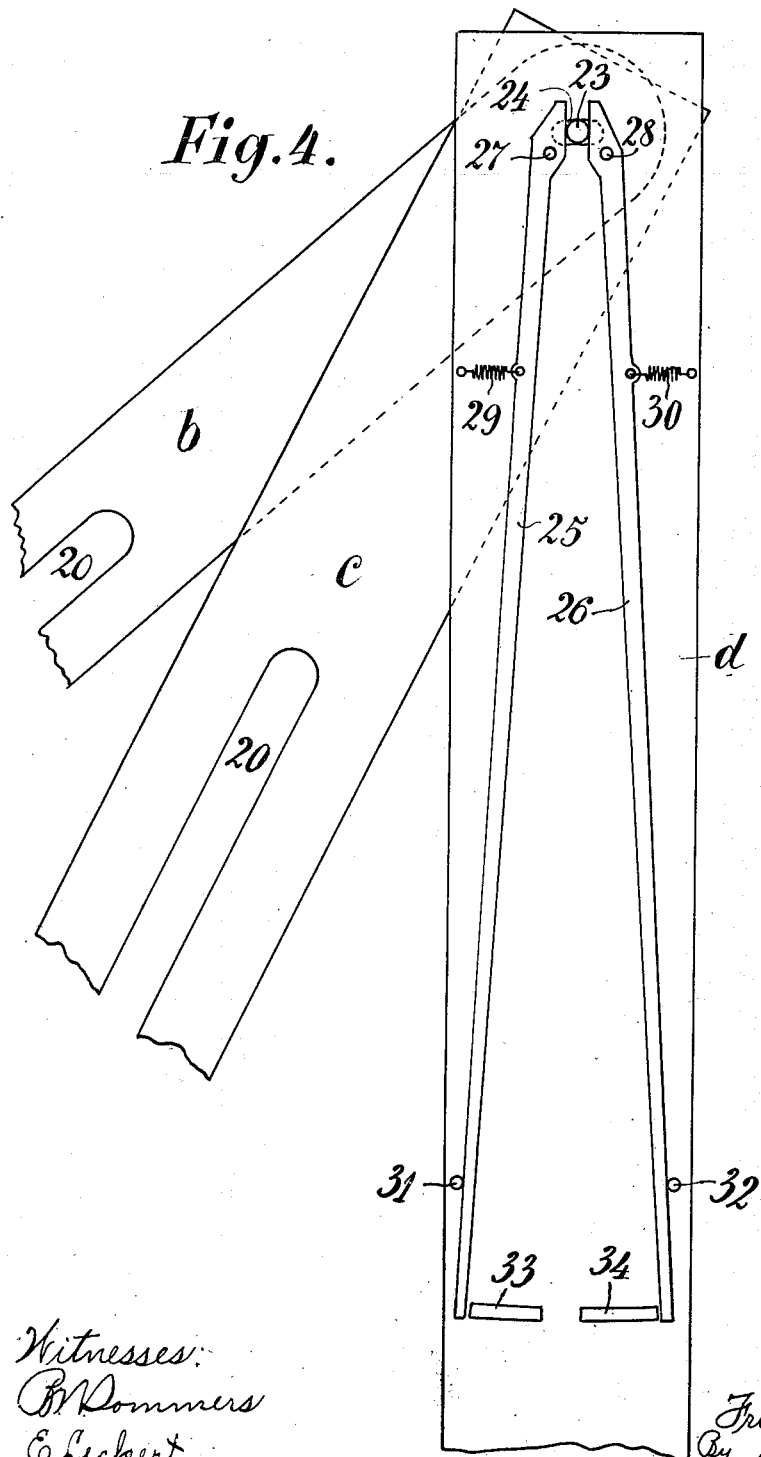
Figure 5:
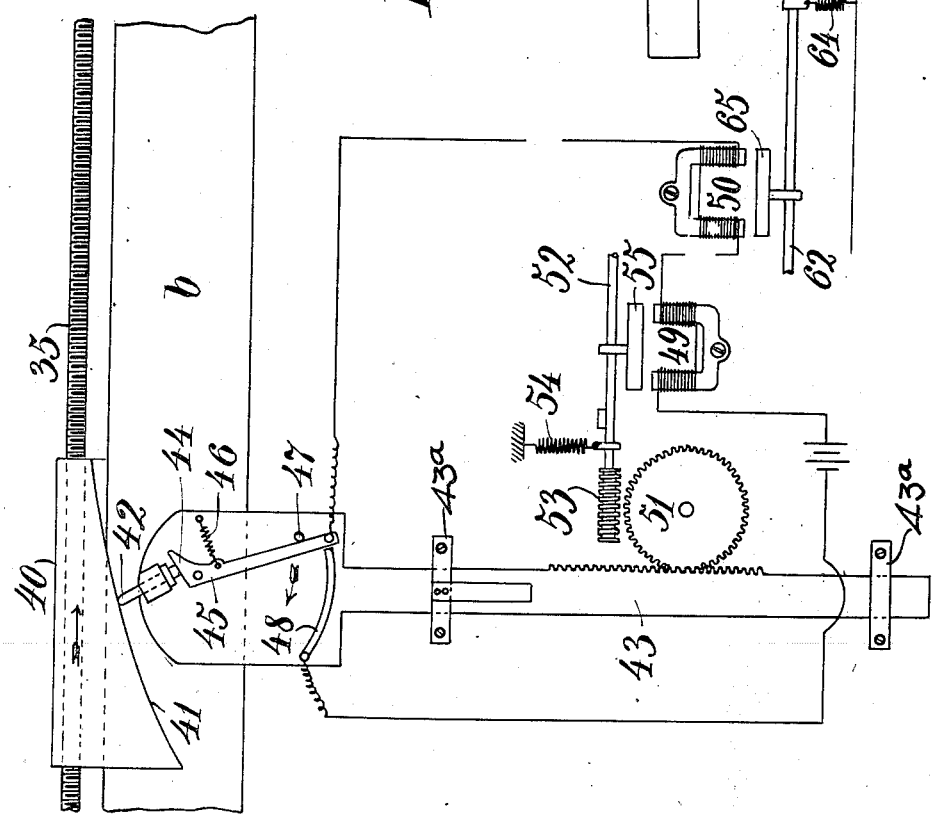

Figure 1 is a general diagrammatic plan view in which A and B represent two guns, Z the target, C and D two observation telescopes and E the central station for automatic control. Fig. 2 is a plan view of the telescope frame. Fig. 3 is a diagrammatic plan view of the telescope frames, a gun and electrical means connecting them with the automatic central control station. Fig. 4 is a part of the latter on a larger scale. Fig. 5 is a diagram of mechanism for controlling elevation.

In the diagram, Fig. 1, for the purpose of simplifying the explanation of the principle of the invention, it is supposed to be possible to provide rods (O, P, Q, R) between the central station and the guns and sighting apparatus, which rods operate toothed wheels meshing with wheels on the guns and sighting apparatus. In practice, of course the distance between the points will be too great to make such arrangement possible.

In order to facilitate the understanding, the diagram shows an arrangement at the central station E, in which $a$ and $b$ are two rules or bars parallel to the guns A and B respectively; $c$ and $d$ are two other rules or bars parallel to the telescopes C and D respectively. All the rules or bars have a common point of intersection $z$ at which they are connected together by means of a pin or pivot. The bars are pivotally mounted at the points $f$, $g$, $h$, $i$, respectively indicated on the drawing by circles and are movable longitudinally upon these pivotal mountings. The circles represent toothed or spur wheels, and the vertical pivots of the guns and of the telescopes have mounted thereon toothed wheels F, G, H, I. These latter are respectively equal in size to the wheels at $f$, $g$, $h$ and $i$. These eight toothed wheels $f$, $g$, $h$, $i$, F, G, H, I, mesh with the pinions or worms $k$, $l$, $m$, $n$, K, L, M, N, respectively, the axes of which are interconnected in pairs by means of connections O, P, Q, R, respectively, which connections may be of any kind capable of transmitting synchronous movements between the actuating and the actuated devices.

By the above arrangement of toothed wheels and their connections the rules $a$ and $b$ are capable of operating the guns A and B, and the telescopes C and D are capable of operating the rules $c$ and $d$. Now, if one telescope, for instance D, is turned through an angle X in order to follow an object moving along the sight line C—Z of the telescope C the rule or bar $d$ will be moved through the same angle by the toothed wheels I, N, and $n$ $i$, and the rod R; by this movement the rule $c$ will be caused to slide rectilinearly but will not rotate, while the rules $a$ and $b$ will also slide rectilinearly and, in addition will have a rotatory movement imparted to them. The rule $d$ will also have a rectilinear movement to adjust itself to the longitudinal movement of the rule $c$. The rotation of the bars $a$ and $b$ is transmitted to the guns A, B, by the rods O, P, respectively, so that the sight lines of the guns and of the telescopes D and C will continue to intersect each other at the position of the object or target. If the telescope C only be turned, in order to follow an object moving along the sight line of the telescope D, the effect of this movement is reproduced in the same manner in the central apparatus. If both telescopes C and D are moved simultaneously, both bars $c$ and $d$ will rotate in accordance therewith, the movement of the point of intersection $x$ of the bars thus always reproducing on a reduced scale the movement of the point of intersection of the sight lines of the telescopes at which point is found the target Z. Thus by a movement of either one of two telescopes, or by simultaneous movements thereof, one or more guns is or are automatically trained onto an object or target. Not only is the traversing effected in this manner, however, but as the fulcrums of the bars have exactly the same relative position as the guns and the telescopes, the amount of the sliding movement of the bars $a$ and $b$ will be a function or factor of the necessary elevation of the guns. By the present invention this movement is utilized to bring about the elevation automatically.

In carrying out the invention the pinions or worms at the different points are kept in constant rotation in such a manner that those belonging to the same set, namely, ($k$ K), ($l$ L), ($m$ M), or ($n$ N) respectively, move synchronously under the action of synchronously running shafts, or, in preference, electromotors. By suitable means, such as electro-magnetic devices, said pinions or worms during a definite period are coupled in pairs to the devices to be adjusted into position, the electromagnetic devices being controlled by contact devices and one contact device being provided for every pair of interdependent electromagnets. In this respect the mode of control as regards the traverse and the elevation is the same.

The turning movement of the telescopes by means of the electrical devices effects the coupling of the synchronous shafts on the sighting stations and the control station, and at the latter bars $c$ and $d$ will perform angular movements precisely corresponding to the angular movements of the telescopes C and D respectively; also by this movement the power transmitting devices appertaining to the bars $a$ and $b$ and to the guns A and B respectively will be actuated.

In the present instance two telescopes at different stations are supposed to be made use of, but this is not necessary, as the invention may also be adapted for a single sighting station supplied with a telescope and with a range finder, the movements of which are transferred to the central apparatus as corresponding angular and longitudinal movements of a bar. For this purpose the sighting station may be remote from the central station, or both stations may be together or in one. In the former case the movements of the range finder may be transferred to the bar on the central apparatus by electrical means, but in the latter case by mechanical means.

The arrangement of mechanisms for transferring the movements of the telescopes to the central apparatus and for transferring the movements of the latter to the gun or guns will now be described. In Fig. 2, two superposed rectangular plates 1 and 2 are pivoted on a fixed vertical pin 3 and are capable of moving relatively to each other. The upper one 1 of said plates supports or forms the base plate of the telescope, and the lower one 2 may be coupled to one of the synchronous motors. The plate 1 has a slot 4 through which projects a pin 5 mounted on the plate 2; 6 and 7 are contact levers pivoted at 8 and 9 respectively, said levers being kept in normal position by springs 10, 11, so as to bear against the stops 12 and 13. Two contact plates 14 and 15 lie in the paths of their respective levers 6 and 7. As shown in Fig. 3 the plate 14 and lever 6 are connected in the circuit of one set of electromagnets while the plate 15 and lever 7 are connected in the circuit of a second set of electromagnets. If the telescopes C and D are turned in one or the other direction one or other of the levers 6 or 7 on the plate 1 in question will be deflected on its contact plate 14 or 15 respectively by means of the pin 5 on the lower plate 2, and close a circuit through the windings of corresponding sets of electromagnets at the telescope station in question and at the central apparatus E. The electromagnets at the telescope stations will cause one or the other synchronously running and reversible motive-power devices such as worms $M^r$ or $M^r$ and $N^1$ or $N^r$ at C and D respectively to be appropriately clutched in with toothed wheels H and I respectively so as to turn the lower plate 2 in question just in the same direction as that into which the plate 1 has been moved. Further, the corresponding electromagnets at the central apparatus E will cause synchronously running worms $m^1$ or $m^r$ and $n^1$ and $n^r$ to be clutched in with toothed wheels $h$ and $i$ on the pivots for the bars $c$ and $d$ respectively, said bars thereby being turned exactly through the same angles as the corresponding plates 2. Now, when the turning movement of the plate 2 in question corresponds with that of the telescope, the pin 5 will again assume its position in the middle of the slot 4 so that the contact lever in question is moved away from its contact piece and the cutting out of the circuit for the electromagetic clutches will take place simultaneously at the telescope and at the central apparatus.

The operation following the turning movements of the bars $c$ and $d$ is as follows: From Figs. 3 and 4 it will be seen that all the bars are provided with slots 20 and that from each pivot 22 a guide lug 21 of an oblong shape projects through a respective slot 20, so that the bars can slide on the pivots as aforesaid, (in order to simplify the drawing the bar $a$ is not shown). The bars $a$ and $b$ are connected by a pin 23 with the bars $c$ and $d$ and this pin passes through a hole in the bar $c$, in which it fits and through a somewhat elongated hole 24 in the bar $d$ (see especially Fig. 4) in a similar manner as above described with reference to Fig. 2. At both sides of the pin are mounted contact levers 25, 26, which are pivoted on pins 27 and 28 and are kept in normal position by springs 29 and 30, so as to bear against stops 31 and 32. 33 and 34 are contact pieces with which the ends of the levers 25 and 26 respectively come into contact. When, through the movement of the telescopes, the bars $c$ and $d$ commence their movement, the pin 23 will exert a pressure on one or the other of the contact levers 25 or 26, thereby causing that lever to move onto its respective contact plate 33 or 34 and close a circuit. A movement of the sighted object or target toward the guns, corresponds to a turning movement of the bar $d$ which causes the lever 26 on the right hand side to be constantly actuated by the pin 23, and vice versa, for an increase of the range. A movement of the sighted object or target in any direction will immediately be reproduced by the pin 23, which moves accordingly. In order to facilitate the movement of said pin, one of the bars $a$ or $b$ (for instance the bar $b$ as shown in Fig. 3) has a screw 35 mounted thereon in bearings arranged at its ends at 36 and 37 and passing through a nut 38 mounted on the pivot 22. The circuit closed by one of the contacts 25 or 26 will then, by means of one or the other of the rotating worms 16 engaging a wheel 17 and by flexible means 18 cause the screw to be turned in one or the other directions so as to slide the bar $b$ just in the same direction in which the pin 23 tends to move, and the contact lever actuated is thus brought back to its initial position in relation to the pin 23. As soon as this position is reached the circuit will be opened and the sliding movement of the bar $b$ will cease.

If more guns are to be directed automatically toward the same target, more bars, such as $a$ Fig. 1, may be connected to the pin 23 and made capable of sliding longitudinally on pivots shaped in accordance with the pivots 22, as will be readily understood.

The angular movements of the bars $a$ and $b$ cause contact devices of the kind described with reference to Fig. 2 to be actuated. A plate 1 fixed at the top of the pivot 22 for the sliding bar in question as $b$, Fig. 3, carries contact levers 6 and 7, contact plates 14 and 15, while a lower plate 2 with a pin 5 for the control of said levers and with a toothed wheel $g$ surrounding said pivot is rotatable relatively to the same. A sliding movement of the bar will have no effect on the contact device, but when said bar also turns, one or the other of said levers will be deflected and close a circuit through the windings of electromagnets so as to cause corresponding sets of synchronously running worms $l^1$ or $l^r$ and $L^1$ or $L^r$ to engage toothed wheels $g$ and G simultaneously at the central apparatus and at the gun in question so as to impart to the guns A and B angular movements exactly corresponding to the movements of the bars $a$ and $b$ respectively, as illustrated diagrammatically in Fig. 1 and in a manner similar to that described above.

The method of effecting the elevation will now be explained with reference to Fig. 5, which shows in side view a portion of the bar $b$ and a screw 35 mounted on the same. The screw passes through a slide-nut 40 which is caused, by the rotation of the screw on the bar $b$ to slide a distance exactly corresponding to the amount of movement given to the telescopes in order to keep them directed upon the moving object or target, which is supposed to have shifted either toward or from the guns. The elevation of the gun is a function of said distance, as has been previously explained with reference to Fig. 1. On the slide is provided a cam 41, the curvature of which represents said function, and 42 is a sliding pin carried by a reciprocatory rack 43 and moved by the rack into contact with the cam 41. The rack 43, in the arrangement shown, is suitably moved in guides 43ª mounted on a support (not shown) carried by the bar $b$. The lower end of the pin 42 is engaged by the shorter arm 44 of a contact lever 45, which is operated by its spring 46, arrested by a stop 47 and movable over a contact piece 48 exactly in the manner described above with reference to other contact levers. The lever and the contact piece are electrically connected to the electro-magnet 49 at the central station and to the electro-magnet 50 of the gun B. The rack 43 meshes with the spur-wheel 51. 52 is the synchronous shaft at the central station. The electro-magnet 49, spur-wheel 51 and shaft 52 are conveniently mounted on the same support as are the guides 43ª of the rack 43, and the shaft 52 is suitably driven from its synchronously running motor through a flexible coupling. The worm 53 on the shaft 52 is normally kept out of engagement with the spur-wheel 51 by the spring 54, and is brought into engaging position by means of the armature 55. The corresponding parts 61, 62, 63, 64 and 65 of the gun are arranged in a similar manner.

The operation is as follows:—If the slide 40 is moved in the direction of the arrow, so that the cam 41 presses down the pin 42, the contact lever 45 is rotated so as to close the circuit. The consequence is that the magnets 49 and 50 are energized and the worms 53 and 63 on the synchronous shafts 52 and 62 engage and so rotate their respective wheel 51 and quadrant 61 that the wheel 51 will cause the rack 43 to be moved downward, and the contact lever 45 will soon be restored to its normal position by its spring, unless the slide 40 continues its motion. When the contact lever 45 has been restored to its normal position, it will interrupt the circuit, and both worms 53, 63 will be simultaneously moved out of gear, and the gun will have been turned now to an extent dependent on the shape of the cam. As the slide 40 is only capable of effecting elevation the cam 41, when depression as well as elevation is to be provided for, will have to be made double and to operate upon two contact levers, each controlling a separate electric circuit containing electromagnets corresponding to 49 and 50. Instead of having two levers, however, the lever 45 may also be arranged so as to be capable of performing a bilateral deflection on contact arcs on both sides of zero. If the cam device (40, 41) then moves to the left (opposite to the direction of the arrow), the spring 46 will deflect the lever 45 to the right (the pin 47 being dispensed with) and establish contact on this side. According to the direction of motion of the cam device, the one or the other of the circuits will be closed, thereby causing rotation of synchronous shafts, both at the central station and at the gun, and thus elevating or depressing the gun, as the case may be, and simultaneously moving the rack 43 downward or upward respectively, so as to bring the lever acted upon by the cam face back to the zero position at the proper moment. The synchronously running shafts for effecting elevation will of course rotate in an opposite manner to the respective shafts for effecting depression.

It is evident that the cam of the elevation device is given a shape in which all the necessary corrections have been allowed for, or the cam may be corrected by adjustment at any time.

I claim—

1. In a system or apparatus for elevating and traversing guns, telescopes or sighting devices situated at suitable points, a central station having bars corresponding in number and disposition with those of the telescopes and the guns, and synchronously running means controlled and operated from the sighting apparatus for positioning said bars, said bars pivotally connected at a common point, and slidable over fixed points the positions of which correspond to the geographical positions of the telescopes and the guns, and means controlled by said bars to control the movement of the guns, whereby the angular movements of the telescopes are communicated to the corresponding bars at the central station and also the consequent angular motion of the bars corresponding to the guns is communicated to the guns.

2. In an ordnance sighting system a telescope, having a revoluble base, a plate, a pivot between the base and plate, a pin projecting through a slot in said base, two contact levers (6, 7) whose shorter arms are spring held against said pin, and contact arcs in the paths of the longer arms of said levers when said arms are moved by the displacement of the plate when the telescope is rotated.

3. In an ordnance sighting system, the combination with a telescope base, a plate, a pivot between the plate and base, a bar corresponding in direction to said base, synchronously operating means for moving said plate and bar, and electric contacts, and contact levers on said base to control the operation of said means.

4. In an ordnance sighting system, a sighting instrument, guns distanced from the instrument whose lines of sight intersect that of the instrument, a bar pertaining to each gun and parallel therewith, a bar parallel with the instrument, said bars having a pivot common to all of them, and each bar being in sliding connection with a separate pivot, means to impart angular movement from the instrument to its corresponding bar and thereby angularly position the bars pertaining to the guns, and means to impart equal angular movement from the latter bars to their pertaining guns.

5. In a combined range finding and automatic sighting and gun training system, a telescope having a pivoted base, a plate for supporting said base, a pin on the plate projecting through a slot in the base, a pair of pivoted contact levers on the base, means to keep the short arms of the levers against said pin, contact pieces disposed in the path of the long arms of said levers when the latter are moved by the displacement of the telescope base relatively to said plate, electric circuits connected with said levers and the contact pieces, electromagnets in said circuits, a synchronized-motor at the telescope station, a central station, a synchronized-motor and a bar at the central station, and coupling and reversing means at each motor acted upon simultaneously by said electromagnets and actuating said pin carrying plate and said bar respectively as long as a contact lever is in contact with its contact piece.

6. In a combined range finding and automatic sighting and gun training system, telescopes, guns distanced from the latter, a central control station having bars capable of longitudinal and rotary motion in a horizontal plane through and around fixed points, a pin pivotally connecting said bars to each other at one point, one of said bars having a slot, a pair of pivoted contact levers, means to keep the short arms of the latter against said pin, contact pieces disposed in the paths of the long arms of the contact levers, motive power devices for the longitudinal displacement of one of the bars, and electric circuits connecting the contact levers and the contact pieces with electromagnetic clutches to control the operation of said devices.

7. In a combined range finding and automatic sighting and gun training system, a central station, a pivoted bar at said station slidable longitudinally of its pivot, a base on said pivot, a member rotatable on said pivot, a pin on said member projecting through a slot in the base, a pair of pivoted contact levers on the base, means to keep the short arms of the levers against said pin, contact pieces disposed in the path of the long arms of the contact levers when the latter are moved by the displacement of the base relatively to said member, electric circuits connected with the contact levers and the contact pieces, electromagnets in said circuits, a synchronized motor at the central station, a synchronized motor at a gun, and coupling and reversing means at each motor, the gun acted upon simultaneously by the said electromagnets and actuating said pin carrying member and the gun respectively as long as a contact lever is in contact with its contact piece.

8. In a combined range finding and automatic sighting and gun training system, a central station comprising a set of bars capable of longitudinal and angular motion in a horizontal plane, a slide having a curved guide displaceable along the bar corresponding to the gun, a member transversely movable on said bar, a contact lever on said member arranged to be deflected by means of the curved guide when the slide and the bar are longitudinally displaced relatively, a contact rail on said member in the path of said lever, a synchronized motor at the central station, a synchronized motor at the gun, and means whereby said motors are coupled with the transversely movable member and the gun elevating mechanism respectively, as long as the said contact lever is in contact with said contact rail.

In testimony that I claim the foregoing as my invention, I have signed my name in presence of two subscribing witnesses.

FRIDTJOV ANDERSEN.

Witnesses:
H. E. GULLODENSEN,
O. SCHIANDER.